US009575692B2

(12) United States Patent
Han et al.

(10) Patent No.: US 9,575,692 B2
(45) Date of Patent: Feb. 21, 2017

(54) CACHE CONTROL DEVICE HAVING FAULT-TOLERANT FUNCTION AND METHOD OF OPERATING THE SAME (71) Applicant: ELECTRONICS AND TELECOMMUNICATIONS RESEARCH INSTITUTE, Daejeon (KR)

(72) Inventors: Jin Ho Han, Seoul (KR); Young Su Kwon, Daejeon (KR)

(73) Assignee: ELECTRONICS AND TELECOMMUNICATIONS RESEARCH INSTITUTE, Daejeon (KR)

( * ) Notice: Subject to any disclaimer, the term of this patent is extended or adjusted under 35 U.S.C. 154(b) by 59 days.

(21) Appl. No.: 14/690,843

(22) Filed: Apr. 20, 2015

(65) Prior Publication Data
US 2015/0309862 A1 Oct. 29, 2015

(30) Foreign Application Priority Data

Apr. 23, 2014 (KR) ........................ 10-2014-0048665

(51) Int. Cl.
*G11C 29/00* (2006.01)
*G06F 3/06* (2006.01)
*G06F 11/10* (2006.01)

(52) U.S. Cl.
CPC ............. *G06F 3/0673* (2013.01); *G06F 3/064* (2013.01); *G06F 3/0619* (2013.01); *G06F 11/1064* (2013.01)

(58) Field of Classification Search
CPC ...... G06F 3/0673; G06F 3/0619; G06F 3/064; G06F 11/1064
See application file for complete search history.

(56) References Cited

U.S. PATENT DOCUMENTS

| 6,591,335 | B1 | 7/2003 | Sade et al. |
| 6,681,299 | B1 * | 1/2004 | Shimamura ......... G06F 11/1064 |
| | | | 711/120 |
| 7,966,514 | B2 | 6/2011 | Surasinghe |
| 8,051,247 | B1 | 11/2011 | Favor et al. |
| 8,151,087 | B2 | 4/2012 | Lee et al. |
| 2010/0306632 | A1 * | 12/2010 | Carlough ............. H03M 13/09 |
| | | | 714/801 |
| 2012/0084628 | A1 * | 4/2012 | Cox ..................... G06F 11/167 |
| | | | 714/763 |

* cited by examiner

*Primary Examiner* — Sam Rizk
(74) *Attorney, Agent, or Firm* — LRK Patent Law Firm (57) ABSTRACT The cache control device having the fault-tolerant function includes a cache memory configured to store first data with respect to a specific address read from a main memory, and generate and store a first parity bit corresponding to the first data, a shadow cache memory configured to store second data with respect to the specific address, and generate and store a second parity bit corresponding to the second data, and a fault detector configured to perform a parity check operation on the data of the specific address and the parity bit stored in at least one of the cache memory and the shadow cache memory when receiving a data read request with respect to the specific address from a processor, and transmit the data stored in a non-erroneous memory to the processor according to a result of the parity check operation.

13 Claims, 5 Drawing Sheets

CACHE CONTROL DEVICE HAVING FAULT-TOLERANT FUNCTION AND METHOD OF OPERATING THE SAME

CROSS-REFERENCE TO RELATED APPLICATION

This application claims priority to and the benefit of Korean Patent Application No. 10-2014-0048665, filed on Apr. 23, 2014, the disclosure of which is incorporated herein by reference in its entirety.

BACKGROUND

1. Field of the Invention

The present invention relates to a cache control device, and more particularly, to a cache control device having a function preventing a fault of a cache memory due to a soft error.

2. Discussion of Related Art

A cache memory is located between a processor and a main memory of a computer, and a memory operating at a high speed under the control of the processor. The cache memory has a smaller storage capacity than the main memory, and has a higher response speed than the main memory. Accordingly, data stored in the cache memory is accessed more quickly than data stored in the main memory.

A portion of data and instructions stored in the main memory may be stored in the cache memory. For example, the cache memory temporarily stores an instruction and data required by the processor together with, an address.

However, when an error is generated in the cache memory due to external factors and an erroneous instruction is read from the cache memory, the processor performs an operation of an unwanted program, or recognizes as an instruction which does not exist since the instruction read from the cache memory cannot be analyzed. Further, when erroneous data from the cache memory is read, the program generates an erroneous result due to the erroneous data.

SUMMARY OF THE INVENTION

The present invention is directed to providing a technological way for correcting an error in order not to show a fault state to the outside even when the error is generated in a cache memory.

According to one aspect of the present invention, there is provided a cache control device having the fault-tolerant function including: a cache memory configured to store first data with respect to a specific address read from a main memory, and generate and store a first parity bit corresponding to the first data; a shadow cache memory configured to store second data with respect to the specific address, and generate and store a second parity bit corresponding to the second data; and a fault detector configured to perform a parity check operation on the data of the specific address and the parity bit stored in at, least one of the cache memory and the shadow cache memory when receiving a data read request with respect to the specific address from a processor, and transmit the data stored in a non-erroneous memory to the processor according to a result of the parity check operation.

The first data and the second data are the same, and the first parity bit and the second parity bit are different.

The fault detector detects whether a parity of the first data and the first parity bit are the same, and detects whether a parity of the second data and the second parity bit are the same.

The fault detector transmits the first data to the processor when the result of the parity check operation indicates that there is not an error in both of the first data and the second data.

When the result of the parity check operation on the first data indicates that there is an error, the fault detector performs the parity check operation on the second data, and when there is not an error in the second data, transmits the second data to the processor.

When the result of the parity check operation indicates that there is an error in both of the first data and the second data, the fault detector outputs an error message.

When the result of the parity check operation on the first data indicates that there is an error, the fault detector compares the first parity bit and the second parity bit, when the first parity bit and the second parity bit are different, performs the parity check operation on the second data, and when there is not an error in the second data, transmits the second data to the processor.

When the result of the parity check operation on the first data indicates that there is an error, the fault detector compares the first parity bit and the second parity bit, and when the first parity bit and the second parity bit are the same, outputs an error message.

Each of the cache memory and the shadow cache memory comprises a tag memory and a data memory, the specific address is stored in the tag memory of each of the cache memory and the shadow cache memory, the first data and the first parity bit are stored in the data memory of the cache memory, and the second data and the second parity bit are stored in the data memory of the shadow cache memory.

The first parity bit is generated by an even parity method, and the second parity bit is generated by an odd parity method.

According to another aspect of the present invention, there is provided a method of preventing a fault of a cache control device, including: storing first data with respect to a specific address read from a main memory and generating and storing a first parity bit corresponding to the first data, in, a cache memory, and storing second data with respect to the specific address and generating and storing a second parity bit corresponding to the second data, in a shadow cache memory; receiving a data read request with respect to the specific address from a processor; and when receiving the data read request, performing a parity check operation on the data of the specific address and the parity bit stored in at least one of the cache memory and the shadow cache memory, and transmitting the data stored in a non-erroneous memory to the processor according to a result of the parity check operation.

The first data and the second data are the same, and the first parity bit and the second parity bit are different.

The transmitting of the data comprises performing the parity check operation of detecting whether a parity of the first data and the first parity bit are the same, and detecting whether a parity of the second data and the second parity bit are the same.

The transmitting of the data comprises transmitting the first data to the processor when the result of the parity check operation indicates that there is not an error in both of the first data and the second data.

The transmitting of the data comprises: performing the parity check operation on the first data; when the result of the parity check operation indicates that there is an error in the first data, performing the parity check operation on the second data; and when the result of the parity check operation indicates that there is not an error in the second data, transmitting the second data to the processor.

The transmitting of the data further comprises: when the result of the parity check operation indicates that there is an error in both of the first data and the second data, outputting an error message.

The transmitting of the data further comprises: when the result of the parity check operation indicates that there is an error in the first data, comparing the first parity bit and the second parity bit; when the result of the comparing indicates that the first parity bit and the second parity bit are different, performing the parity check operation on the second data; and when the result of the parity check operation indicates that there is no error in the second data, transmitting the second data to the processor.

The transmitting of the data further comprises: when the result of the parity check operation on the first data indicates that there is an error in the first data, comparing the first parity bit and the second parity bit; and when the result of the comparing indicates that the first parity bit and the second parity bit are the same, outputting an error message.

BRIEF DESCRIPTION OF THE DRAWINGS

The above and other objects, features, and advantages of the present invention will become more apparent to those of ordinary skill in the art by describing in detail exemplary embodiments thereof with reference to the accompanying drawings, in which.

DETAILED DESCRIPTION OF EXEMPLARY EMBODIMENTS

Hereinafter, exemplary embodiments of the present invention will be described in, detail below with reference to the accompanying drawings. Example embodiments of the present invention are described below in sufficient detail to enable those of ordinary skill in the art to embody and practice the present invention.

Figure 1:
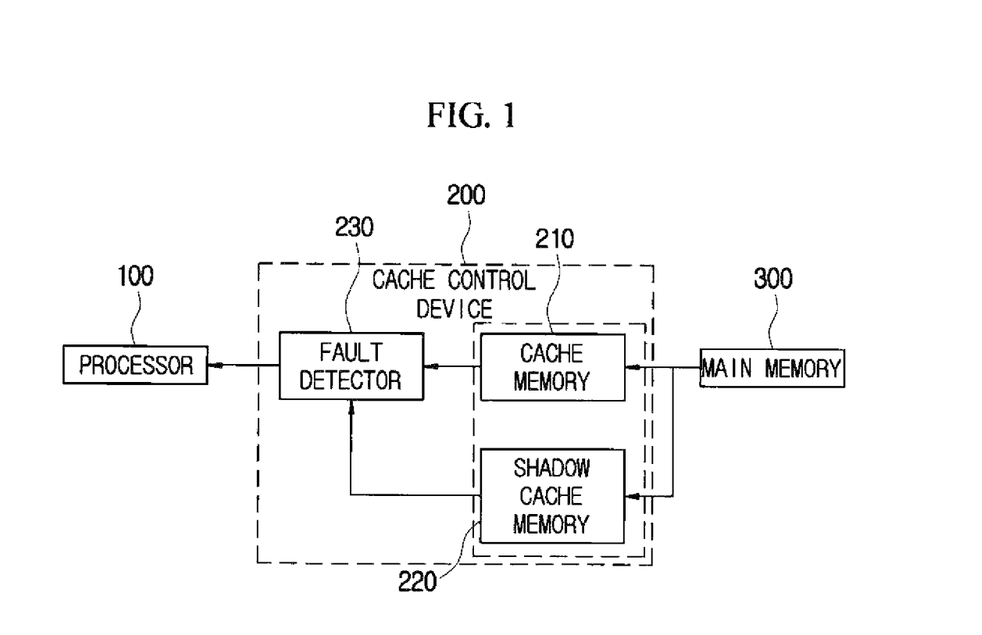
FIG. 1 is a system block diagram illustrating an operation environment of a cache control device having a fault-tolerant function according to an embodiment of the present invention.

FIG. 1 is a system block diagram illustrating an operation environment of a cache control device having a fault-tolerant function according to an embodiment of the present invention.

As shown in FIG. 1, a cache control device 200 may operate in a system environment in which a processor 100 and a main memory 300 are included.

Here, the processor 100 may do a read request of an instruction or data with respect to a specific address to the main memory 300, and receive the instruction or the data of the specific address searched in the main memory 300. The processor 100 receiving the instruction or the data may perform a function (a program) corresponding to the received instruction, or process the data and output the processed data. At this time, the processor 100 may receive only the instruction or the data confirmed to have no error by the cache control device 200 configured between the processor 100 and the main memory 300. Hereinafter, for convenience of description, the "instruction or data" will be collectively described as "data".

Further, the processor 100 may do a data write request with respect to a specific address to the cache control device 200. Accordingly, data with respect to the specific address read from the main memory 300 may be stored in a memory (a cache memory 210 and a shadow cache memory 220) configured in the cache control device 200. A detailed description of the cache control device 200 will be described below with reference to FIG. 3.

The main memory 300 may be a storage means for storing data, and may be a nonvolatile memory. Here, the main memory 300 may store a specific address, and data with respect to the specific address. For example, when receiving a data read request with respect to the specific address from the processor 100, the main memory 300 may search whether the requested specific address is stored. When the requested specific address is stored as a result of the search, the main memory 300 may transmit data with respect to the searched specific address to the processor 100. At this time, whether there is an error in the data transmitted from the main memory 300 may be confirmed by the cache control device 200, and the confirmed data may be transmitted to the processor 100.

The cache control device 200 may locate between the processor 100 and the main memory 300, may confirm whether there is an error in the data transmitted from the main memory 300, and transmit the data to the processor 100 when there is no error. For this, as shown in FIG. 1, the cache control device 200 may include the cache memory 210, the shadow cache memory 220, and a fault detector 230.

The cache memory 210 may store a specific address read from the main memory 300, and first data with respect to the specific address. At this time, when receiving the data read request with respect to the specific address from the processor 100, the cache memory 210 may read data of the specific address from the main memory 300, and store the read data as the first data. Here, the first data may be equal, to second data stored in the shadow cache memory 220 described hereinafter.

The cache memory 210 may generate a first party bit corresponding to the first data and store the first parity bit. Here, the first parity bit may be generated according to a parity of the first data, and be generated by one of an even parity method or an odd parity method, and the generated first parity bit may be stored. For example, supposing that the first data is "1101", the first parity bit may be stored as "1" by the even parity method, and the first parity bit may be stored as "0" by the odd parity method. According to an embodiment of the present invention, the first parity bit may be generated by the even parity method and be stored.

Figure 2:
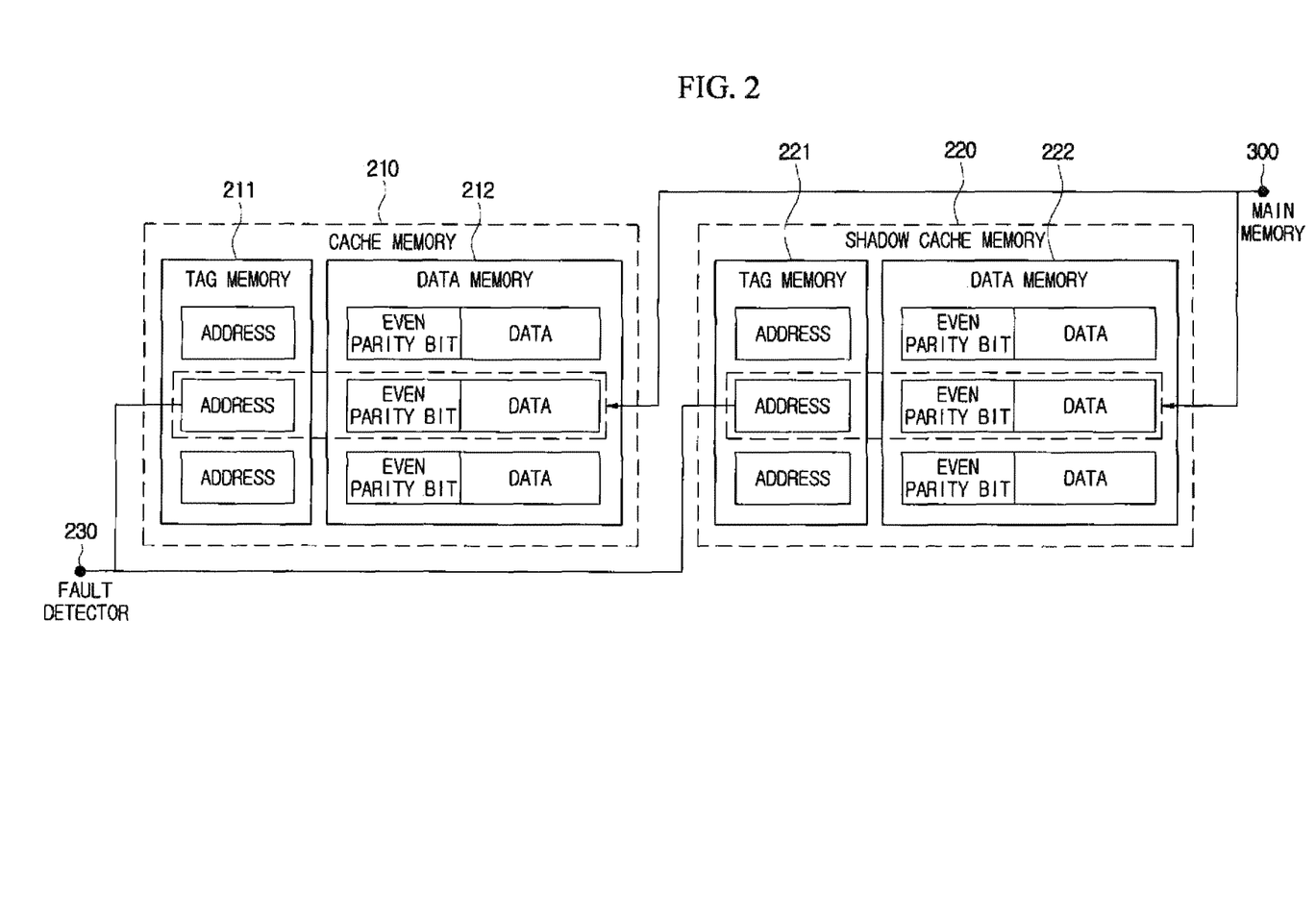
FIG. 2 is a diagram illustrating an internal construction of a cache control device according to an embodiment of the present invention.

For this, as shown in FIG. 2, the cache memory 210 may include a tag memory 211 and a data memory 212. The specific address requested by the processor 100 may be stored in the tag memory 211 of the cache memory 210. Further, the first data read from the main memory 300 with respect to the specific address may be stored in the data memory 212 of the cache memory 210, and also the first parity bit corresponding to the first data may be generated and be stored in the data memory 212 of the cache memory 210.

Like the cache memory 210, the shadow cache memory 220 may store the specific address read from the main memory 300, and the second data with respect to the specific address. At this time, like the cache memory 210, the shadow cache memory 220 may read data with respect to the specific address from the main memory 300 when receiving the data read request with respect to the specific address from the processor 100, and store the read data as the second data. Here, the second data may be equal to the first data stored in the cache memory 210 described above.

Further, the shadow cache memory 220 may generate a second parity bit corresponding to the second data, and store the generated second parity bit. Here, the second parity bit may be generated according to a parity of the second data, be generated by one of the even parity method or the odd parity method, and be stored. For example, supposing that the second data is "1101", the second parity bit may be stored as "1" by the even parity method, and the second parity bit may be stored as "0" by the odd parity method.

At this time, the second parity bit may be different from the first parity bit generated and stored in the cache memory 210 described above. This is because the first parity bit and the second parity bit with respect to the same data (the first data and the second data) are generated by parity methods different from each other. As one example, when the first parity bit is generated by the even parity method, the second parity bit may be generated by the odd parity method. As another example, when the first parity bit is generated by the odd parity method, the second parity bit may be generated by the even parity method. According to an embodiment of the present invention, the first parity bit may be generated by the even parity method, and the second parity bit may be generated by the odd parity method. For example, supposing that the first and second data are "1101", the first parity bit may be generated as "1" and the second parity bit may be generated as "0", and the first parity bit and the second parity bit may be stored in the cache memory 210 and the shadow cache memory 220, respectively.

Like the cache memory 210, as shown in FIG. 2, the shadow cache memory 220 may include a tag memory 221 and a data memory 222. The specific address may be stored in the tag memory 221 of the shadow cache memory 220, the second data may be stored in the data memory 222, and also the second parity bit corresponding to the second data may be generated and be stored in the data memory 222.

The fault detector 230 may perform a parity check operation on data and a parity bit of the specific address stored, in the cache memory 210 and the shadow cache memory 220, and transmit the data (the first data or the second data) stored in a non-erroneous memory of the two memories (the cache memory 210 and the shadow cache memory 220) to the processor 100 according to the result of the parity check operation.

Specifically, when receiving the data read request with respect to the specific address from the processor 100, the fault detector 230 may perform the parity check operation with respect to the data and parity bit read from, each of the cache memory 210 and the shadow cache memory 220.

At this time, the fault detector 230 may perform the parity check operation of confirming whether the parity of the first data read from the cache memory 210 is equal to the first parity bit. For example, the fault detector 230 may calculate the parity with respect to the first data by the even parity method, and perform the parity check operation of confirming whether the calculated parity is equal to the first parity bit. At this time, the calculated parity may be generated by the same parity method as the first parity bit. When the calculated parity is equal to the first parity bit, the first data may be determined as non-erroneous data. When the calculated parity is not equal to the first parity bit, the first data may be determined as erroneous data.

Further, the fault detector 230 may perform the parity check operation of confirming whether a parity of the second data read from the shadow cache memory 220 is equal to the second parity bit. For example, the fault detector 230 may calculate the parity with respect to the second data by the odd parity method, and perform the parity check operation of confirming whether the calculated parity bit is equal to the second parity bit. At this time, the calculated parity may be generated by the same method as the second parity bit. When the calculated parity is equal to the second parity bit, the second data may be determined as non-erroneous data. When the calculated parity is not equal to the second parity bit, the second data may be determined as erroneous data.

At this time, the fault detector 230 may simultaneously or sequentially perform the parity check operation with respect to the cache memory 210 and the shadow cache memory 220.

As one example, when receiving the data read request with respect to the specific address from the processor 100, the fault detector 230 may simultaneously perform the parity check operation on the first data and the first parity bit read from the cache memory 210 and the parity check operation on the second data and the second parity bit read from the shadow cache memory 220. According to the result of the parity check operations, the fault detector 230 may read the data (the first data or the second data) stored in a non-erroneous memory (the cache memory 210 or the shadow cache memory 220), and transmit the read data to the processor 100.

For example, when the result of the parity check operation indicates that there is not an error in both of the first data and the second data, the fault detector 230 may read the data stored in at least one of the cache memory 210 and the shadow cache memory 220, and transmit the read data to the processor 100. Preferably, when there is not an, error in the first data and the second data, the fault detector 230 may read the data, that is, the first data, stored in the cache memory 210, and transmit the read data to the processor 100.

Moreover, when the result of the parity check operation indicates that there is an error in the first data and there is not an error in the second data, the fault detector 230 may read the second data stored in the shadow cache memory 220, and transmit the read data to the processor 100. Similarly, when the result of the parity check operation indicates that there is not an error in the first data and there is an error in the second data, the fault detector 230 may read the first data stored in the cache memory 210, and transmit the read first data to the processor 100.

When the result of the parity check operation indicates that there is an error in both the first and second data, the fault detector 230 may output an error message. For example, the fault detector 230 may generate the error message in order to inform the outside (for example, a user) of the occurrence of a fault.

As another example, when receiving the data read request with respect to the specific address from the processor 100, the fault detector 230 may first perform the parity check operation on the first data and the first parity bit read from the cache memory 210. When the result of the parity check operation indicates that there is not an error in the first data, the fault detector 230 may not perform the parity check operation on the second data and the second parity bit, read the data, that is, the first data, stored in the cache memory 210, and transmit the read data to the processor 100.

When the result of the parity check operation indicates that there is an error in the first data, the fault detector 230 may perform the parity check operation on the second data and the second parity bit read from the shadow cache memory 220. When the result of the parity check operation indicates that there is not an error in the second data, the fault detector 230 may read the data, that is, the second data, stored in the shadow cache memory 220, and transmit the read data to the processor 100. When the result of the parity check operation indicates that there is also an error in the second data, the fault detector 230 may generate an error message in order to inform the outside of the occurrence of a fault.

As still another example, when receiving the data read request with respect to the specific address from the processor 100, the fault detector 230 may first perform the parity check operation on the first data and the first parity bit read from the cache memory 210. When the result of the parity check operation indicates that there is not an error in the first data, the fault detector 230 may not perform the parity check operation on the second data and the second parity bit, read the data, that is, the first data, stored in the cache memory 210, and transmit the read data to the processor 100.

When the result of the parity check operation indicates that there is an error in the first data, the fault detector 230 may compare the first parity bit read from the cache memory 210 and the second parity bit read from the shadow cache memory 220. Here, since the first parity bit and the second parity bit are generated by the parity method different from each other with respect to the same data (the first data and the second data) and are stored, the first parity bit and the second parity bit should be different.

When the result of the comparing indicates that the first parity bit is equal to the second parity bit, the fault detector 230 may not perform the parity check operation on the second data and the second parity bit, and output an error message.

When the result of the comparing indicates that the first parity bit is different from the second parity bit, the fault detector 230 may perform the parity check operation on the second data and the second parity bit read from the shadow cache memory 220. When the result of the parity check operation on the second data and the second parity bit indicates that there is not an error in the second data, the fault detector 230 may read the data, that is, the second data, read from the shadow cache memory 220, and transmit the read data to the processor 100. When the result of the parity check operation on the second data and the second parity bit indicates that there is an error in the second data, the fault detector 230 may output an error message.

According to an embodiment of the present invention, a probability in which the faults due to soft error in the two memories (the cache memory and the shadow cache memory) are simultaneously generated can be decreased by further including the cache memory for storing data with respect to the specific address read from the main memory, and generating and storing the parity bit with respect to the data, and the shadow cache memory for storing the same data with respect to the same specific address as the cache memory, and storing the parity bit generated by the parity method different from the cache memory.

Further, according to another embodiment of the present invention, when receiving the data read request with respect to the specific address from the processor and transmitting the data with respect to the specific address read from the main memory to the processor, even if an error is generated in the cache memory, the error may be corrected by the shadow cache memory of storing the parity bit generated by the parity method different from the cache memory, and the data can be transmitted to the processor without showing the fault to the outside.

Moreover, according to still another embodiment of the present invention, when there is a fault in the cache memory, only the parity bit may be read from the shadow cache memory, and whether there is an error in the shadow cache memory may be determined by comparing the read parity bit with the parity bit of the cache memory. Accordingly, a circuit delay time used for the comparing can be minimized.

Figure 3:
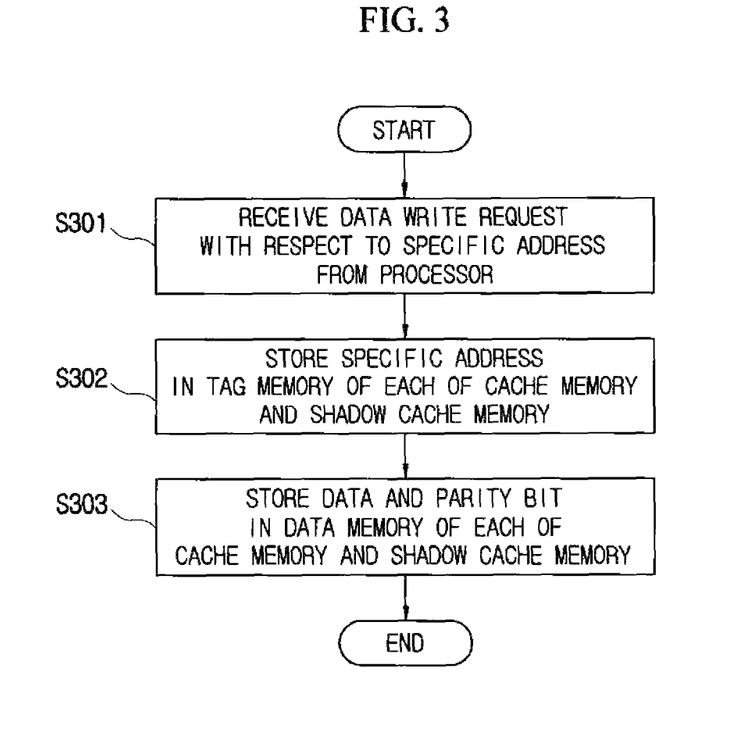
FIG. 3 is a flowchart for describing a data write operation of a cache control device according to an embodiment of the present invention.

FIG. 3 is a flowchart for describing a data write operation of a cache control device according to an embodiment of the present invention. Here, the following operation is performed by the cache control device 200 unless specifically described.

In step S301, an operation of receiving the data write request with respect to the specific address from the processor 100 may be performed. At this time, even when the main memory 300 receives the data write request with respect to the specific address from the processor 100, the cache control device 200 may regard it as the data write request.

When receiving the data write request in step S301, in step S302, an operation of storing the specific address in each of the cache memory 210 and the shadow cache memory 220 in response to the data write request from the processor 100 may be performed. For example, the cache control device 200 may search whether the specific address is stored in the main memory 300 in response to the data write request, and when the specific address is stored in the main memory 300, the specific address may be stored in each of the cache memory 210 and the shadow cache memory 220. At this time, the specific address may be stored in the tag memories 211 and 221 which are configured in the cache memory 210 and the shadow cache memory 220, respectively. Here, the specific address stored in each of the cache memory 210 and the shadow cache memory 220 may be the same.

In step S303, an operation of storing data with respect to the specific address and a parity bit of the data may be performed. For example, the cache control device 200 may read the data with respect to the specific, address stored in step S302 from the main memory 300, and store the read data. Here, the data may be the first data and the second data, the first data may be stored in the cache memory 210, the second data may be stored in the shadow cache memory 220, and the first data and the second data may be the same. At this time, the cache control device 200 may store the data (the first data and the second data) in the data memories 212 and 222 which are configured in the cache memory 210 and the shadow cache memory 220, respectively.

Further, at the same time as storing the data, a parity bit corresponding to the data of each of the cache memory 210 and the shadow cache memory 220 may be generated and stored. For example, the cache control device 200 may generate the first parity bit corresponding to the first data, store the first data and the generated first parity bit in the data memory 212 of the cache memory 210, generate the second parity bit corresponding to the second data, and store the second data and the generated second parity bit in the data memory 222 of the shadow cache memory 220.

At this time, the first parity bit and the second parity bit may be generated by the parity method (the even parity method or the odd parity method) different from each other, and be stored. That is, since the parity bit (the first parity bit and the second parity bit) is generated using a different parity method with respect to the same data (the first data and the second data), the first parity bit and the second parity bit may be differently generated. As one example, when the first parity bit is generated by the even parity method, the second parity bit may be generated by the odd parity method. As another example, when the first parity bit is generated by the odd parity method, the second parity bit may be generated by the even parity method.

According to an embodiment of the present invention, the first parity bit may be generated by the even parity method, and the second parity bit may be generated by the odd parity method. For example, supposing that the first data is "1101", the first parity bit generated by the even parity method may be "1", and the second parity bit generated by the odd parity method may be "0". The generated first parity bit and second parity bit may be stored together with the data (the first data and the second data) in the data memories 212 and 222 of the cache memory 210 and the shadow cache memory 220, respectively.

Figure 4:
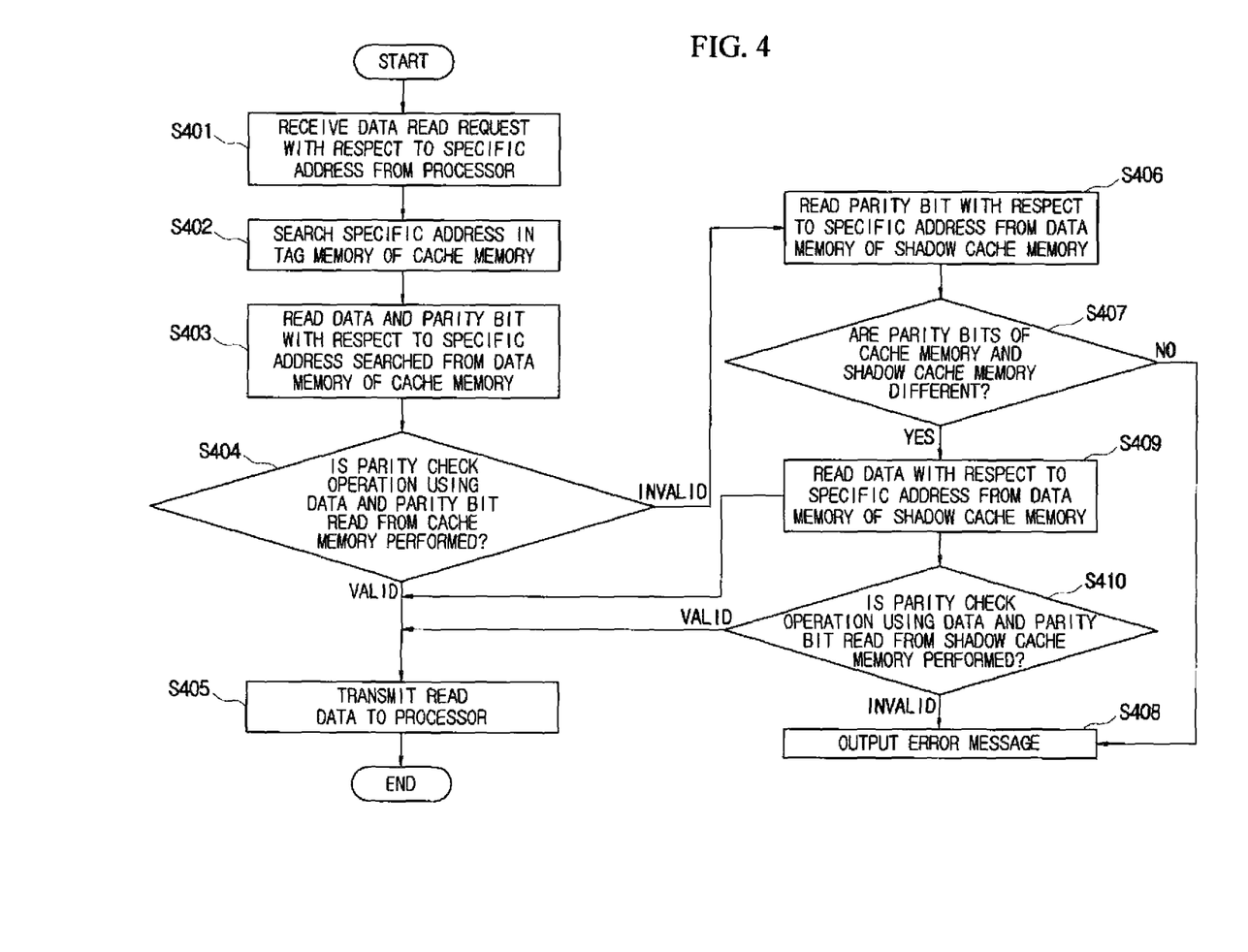
FIG. 4 is a flowchart for describing a data read operation of a cache control device according to an embodiment of the present invention.

FIG. 4 is a flowchart for describing a data read operation of a cache control device according to an embodiment of the present invention. Here, the following operation is performed by the cache control device 200 unless specifically described.

In step S401, an operation of receiving the data read request with respect to the specific address from the processor 100 may be performed. At this time, even when the main memory 300 receives the data read request with respect to the specific address from the processor 100, the cache control device 200 may regard it as the data read request.

When receiving the data read request with respect to the specific address, in step S402, an operation of searching whether the requested specific address is stored in the cache memory 210 may be performed. At this time, the cache control device 200 may search the tag memory 211 in the cache memory 210, and confirm whether the requested specific address is stored.

When the requested specific address is searched in step S402, in step S403, an operation of reading data with respect to the specific address and the parity bit corresponding to the data from the cache memory 210 may be performed. Specifically, the cache control device 200 may read the first data with respect to the specific address and the first parity bit from the cache memory 210.

In step S404, an operation of performing a parity check operation with respect to the first data and the first parity bit read from the cache memory 210 may be performed. For example, the cache control device 200 may perform the parity check operation of confirming whether the parity of the first, data and the first parity bit read from the cache memory 210 are the same.

Here, a method of calculating the parity with respect to the first data may be equal to the parity method of generating the first parity bit in the cache memory 210. For example, according another embodiment of the present, the parity with respect to the first data read from the cache memory 210 may be calculated by the even parity method.

The cache control device 200 may perform the parity check operation of confirming whether the calculated parity is equal to the first parity bit. Here, when the calculated parity is equal to the first parity bit, the first data may be determined as non-erroneous data. When the calculated parity is not equal to the first parity bit, the first data may be determined as erroneous data.

When the first data is determined as the non-erroneous data (valid) in step S404, in step S405 the cache control device 200 may transmit the first data read from the cache memory 210 in step S403 to the processor 100. That is, when the result of the parity check operation in step S404 indicates that there is not an error in the first data, the cache control device 200 may not perform the parity check operation with respect to the second data and the second parity bit, read the first data stored in the cache memory 210, and transmit the read first data to the processor 100.

When the first data is determined as the erroneous data (invalid) in step S404, in step S406, an operation of reading the second parity bit from the shadow cache memory 220 may be performed. At this time, the cache control device 200 may knot read the second data from the shadow cache memory 220, but read only the second parity bit.

In step S407, the cache control device 200 may compare the second parity bit read in step S406 with the first parity bit. Specifically, the cache control device 200 may compare whether the second parity bit read from the shadow cache memory 220 and the first parity bit read from the cache memory 210 are different from each other. Here, since each of the first parity bit and the second parity bit is generated by a different the parity method with respect to the same data (the first data and the second data) and the generated first and second parity bits are stored, it may be determined that there is not an error data when the first parity bit and the second parity bit are different from each other.

When the result of the comparing in, step S407 indicates that the first parity bit and the second parity bit are the same, in step S408, an operation of outputting an error message may be performed. For example, when the first parity bit and the second parity bit are the same, the cache control device 200 may not perform the parity check operation with respect to the second data and the second parity bit, and output the error message.

When the result of the comparing in step S407 indicates that the first parity bit and the second parity bit are different, in step S409, an operation of reading the second data from the shadow cache memory 220 may be performed.

In step S410, the cache control device 200 may perform the parity check operation on the second data and the second parity bit. For example, the cache control device 200 may perform the parity check operation of confirming whether the parity of the second data read from the shadow cache memory 220 in step S409 and the second parity bit are the same.

Here, a method of calculating the parity with respect to the second data may be equal to the parity method of generating the second parity bit in the shadow cache memory 220. For example, according another embodiment of the present, the parity with respect to the second data read from the shadow cache memory 220 may be calculated by the odd parity method.

The cache control device 200 may perform the parity check operation of confirming whether the calculated parity and the second parity bit are the same. Here, when the calculated parity and the second parity bit are the same, the second data may be determined as non-erroneous data. When the calculated parity and the second parity bit are different, the second data may be determined as erroneous data.

When the second data is determined as the non-erroneous data in step S410, an operation of transmitting the data read in step S409 to the processor 100 may be performed. That is, the cache control device 200 may transmit the second data read from the shadow cache memory 220 to the processor 100.

When the second data is determined as the erroneous data in step S410, the cache control device 200 may output an error message.

According to an embodiment of the present invention, a probability in which the errors in the two memories (the cache memory and the shadow cache memory) simultaneously generates can be decreased due to a soft error by further including the cache memory for storing data with respect to the specific address read from the main memory, and generating and storing the parity bit with respect to the data, and the shadow cache memory for storing the same data with respect to the same specific address as the cache memory, and storing the parity bit generated by the parity method different from the cache memory.

Further, according to another embodiment of the present invention, when receiving the data read request with respect to the specific address from the processor and transmitting the data with respect to the specific address read from the main memory to the processor, even if an error is generated in the cache memory, the error may be corrected by the shadow cache memory of storing the parity bit generated by the parity method different from the cache memory, and the data can be transmitted to the processor without showing the fault state to the outside.

Moreover, according to still another embodiment of the present invention, when there is a fault in the cache memory, only the parity bit may be read from the shadow cache memory, and whether there is an error in the shadow cache memory may be determined by comparing the read parity bit with the parity bit of the cache memory. Accordingly, a circuit delay time used for the comparing can be minimized.

Figure 5:
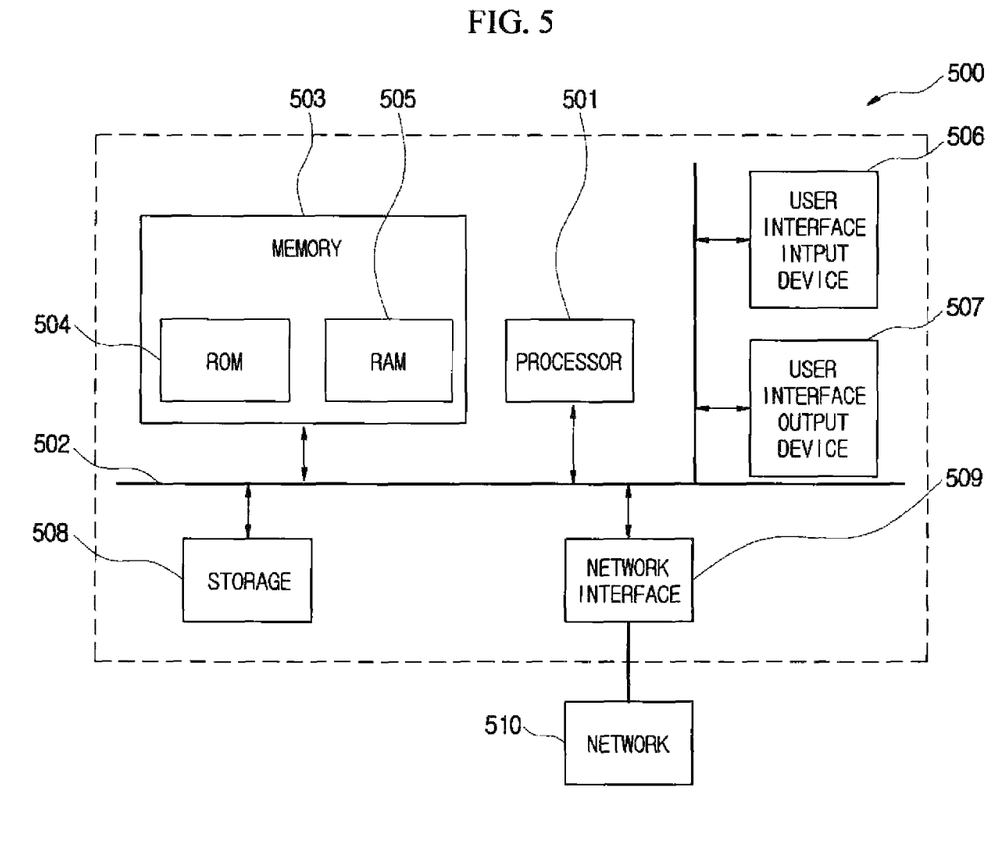
FIG. 5 is a block diagram illustrating a computer system for the present invention.

An embodiment of the present invention may be implemented in a computer system, e.g., as a computer readable medium. As shown in in FIG. 5, a computer system 500 may include one or more of a processor 501, a memory 503, a user input device 506, a user output device 507, and a storage 508, each of which communicates through a bus 502. The computer system 500 may also include a network interface 509 that is coupled to a network 510. The processor 501 may be a central processing unit (CPU) or a semiconductor device that executes processing instructions stored in the memory 503 and/or the storage 508. The memory 503 and the storage 508 may include various forms of volatile or non-volatile storage media. For example, the memory may include a read-only memory (ROM) 504 and a random access memory (RAM) 505.

Accordingly, an embodiment of the invention may be implemented as a computer implemented method or as a non-transitory computer readable medium with computer executable instructions stored thereon. In an embodiment, when executed by the processor, the computer readable instructions may perform a method according to at least one aspect of the invention.

It will be apparent to those skilled in the art that various modifications can be made to the above-described exemplary embodiments of the present invention without departing from the spirit or scope of the invention. Thus, it is intended that the present invention covers all such modifications provided they come within the scope of the appended claims and their equivalents.

What is claimed is:

1. A cache control device having a fault-tolerant function, comprising:
a cache memory configured to store first data with respect to a specific address read from a main memory, and generate and store a first parity bit corresponding to the first data;
a shadow cache memory configured to store second data with respect to the specific address, and generate and store a second parity bit corresponding to the second data; and
a fault detector configured to perform a parity check operation on the data of the specific address and the parity bit stored in at least one of the cache memory and the shadow cache memory when receiving a data read request with respect to the specific address from a processor, and transmit the data stored in a non-erroneous memory to the processor according to a result of the parity check operation,
wherein each of the cache memory and the shadow cache memory comprises a tag memory and a data memory,
the specific address is stored in the tag memory of each of the cache memory and the shadow cache memory,
the first data and the first parity bit are stored in the data memory of the cache memory, and
the second data and the second parity bit are stored in the data memory of the shadow cache memory, and
wherein the first data and the second data are same as each other, and the first parity bit and the second parity bit are same as each other,
when the result of the parity check operation on the first data indicates that there is an error, the fault detector compares the first parity bit and the second parity bit,
when the first parity bit and the second parity bit are different from each other, the fault detector performs the parity check operation on the second data, and when there is no error in the second data, the fault detector transmits the second data to the processor, and
when the first parity bit and the second parity bit are same as each other, the fault detector outputs an error message.

2. The cache control device of claim 1, wherein:
the first data and the second data are same as each other, and the first parity bit is different from the second parity bit,
when the result of the parity check operation on the first data indicates that there is an error, the fault detector compares the first parity bit and the second parity bit,
when the first parity bit and the second parity bit are same as each other, the fault detector performs the parity check operation on the second data, and when there is no error in the second data, the fault detector transmits the second data to the processor, and
when the first parity bit and the second parity bit are different from each other, the fault detector outputs an error message.

3. The cache control device of claim 1, wherein the fault detector detects whether a parity of the first data and the first parity bit are same as each other, and detects whether a parity of the second data and the second parity bit are same as each other.

4. The cache control device of claim 1, wherein the fault detector transmits the first data to the processor when the result of the parity check operation indicates that there is no error in both of the first data and the second data.

5. The cache control device of claim 1, wherein, when the result of the parity check operation on the first data indicates that there is an error, the fault detector performs the parity check operation on the second data, and when there is no error in the second data, transmits the second data to the processor.

6. The cache control device of claim 1, wherein, when the result of the parity check operation indicates that there is an error in both of the first data and the second data, the fault detector outputs an error message.

7. The cache control device of claim 1, wherein the first parity bit is generated by an even parity method, and the second parity bit is generated by an odd parity method.

8. A method of preventing a fault of a cache control device, comprising:
storing first data with respect to a specific address read from a main memory and generating and storing a first parity bit corresponding to the first data, in a cache memory, and storing second data with respect to the specific address and generating and storing a second parity bit corresponding to the second data, in a shadow cache memory;
receiving a data read request with respect to the specific address from a processor; and
when receiving the data read request, performing a parity check operation on the data of the specific address and the parity bit stored in at least one of the cache memory and the shadow cache memory, and transmitting the data stored in a non-erroneous memory to the processor according to a result of the parity check operation,
wherein the first data and the second data are same as each other, and the first parity bit and the second parity bit are same as each other,
wherein the transmitting of the data further comprises:
when the result of the parity check operation indicates that there is an error in the first data, comparing the first parity bit and the second parity bit;
when the result of the comparing indicates that the first parity bit and the second parity bit are different from each other, performing the parity check operation on the second data; and
when the result of the parity check operation indicates that there is no error in the second data, transmitting the second data to the processor, and
wherein the transmitting of the data further comprises:
when the result of the parity check operation on the first data indicates that there is an error in the first data, comparing the first parity bit and the second parity bit; and
when the result of the comparing indicates that the first parity bit and the second parity bit are same as each other, outputting an error message.

9. The method of claim 8,
wherein the first data and the second data are same as each other, and the first parity bit is different from the second parity bit,
wherein the transmitting of the data further comprises:
when the result of the parity check operation, indicates that there is an error in the first data, comparing the first parity bit and the second parity bit;
when the result of the comparing indicates that the first parity bit and the second parity bit are same as each other, performing the parity check operation on the second data; and
when the result of the parity check operation indicates that there is no error in the second data, transmitting the second data to the processor,
wherein the transmitting of the data further comprises:
when the result of the parity check operation on the first data indicates that there is an error in the first data, comparing the first parity bit and the second parity bit; and
when the result of the comparing indicates that the first parity bit and the second parity bit are different from each other, outputting an error message.

10. The method of claim 8, wherein the transmitting of the data comprises performing the parity check operation of detecting whether a parity of the first data and the first parity bit are same as each other, and detecting whether a parity of the second data and the second parity bit are same as each other.

11. The method of claim 8, wherein the transmitting of the data comprises transmitting the first data to the processor when the result of the parity check operation indicates that there is no error in both of the first data and the second data.

12. The method of claim 8, wherein the transmitting of the data comprises:
performing the parity check operation on the first data;
when the result of the parity check operation indicates that there is an error in the first data, performing the parity check operation on the second data; and
when the result of the parity check operation indicates that there is no error in the second data, transmitting the second data to the processor.

13. The method of claim 8, wherein the transmitting of the data further comprises:
when the result of the parity check operation indicates that there is an error in both of the first data and the second data, outputting an error message.

* * * * *